(12) United States Patent
Marce et al.

(10) Patent No.: US 9,002,362 B2
(45) Date of Patent: Apr. 7, 2015

(54) METHOD FOR ENHANCING THE HANDOVER OF A MOBILE STATION AND BASE STATION FOR CARRYING OUT THE METHOD

(75) Inventors: Olivier Marce, Nozay (FR); Arnaud Petit, Sceaux (FR); Van Minh Nguyen, Le Kremlin Bicêtre (FR)

(73) Assignee: Alcatel Lucent, Boulogne-Billancourt (FR)

( * ) Notice: Subject to any disclaimer, the term of this patent is extended or adjusted under 35 U.S.C. 154(b) by 590 days.

(21) Appl. No.: 13/254,253

(22) PCT Filed: Feb. 25, 2010

(86) PCT No.: PCT/EP2010/052425
§ 371 (c)(1),
(2), (4) Date: Jan. 28, 2013

(87) PCT Pub. No.: WO2010/100077
PCT Pub. Date: Sep. 10, 2010

(65) Prior Publication Data
US 2013/0260769 A1 Oct. 3, 2013

(30) Foreign Application Priority Data
Mar. 2, 2009 (EP) .................................. 09305189

(51) Int. Cl.
*H04W 36/00* (2009.01)
*H04W 36/32* (2009.01)
*H04W 36/08* (2009.01)
*H04W 48/20* (2009.01)
*H04W 64/00* (2009.01)

(52) U.S. Cl.
CPC .......... *H04W 36/32* (2013.01); *H04W 36/0061* (2013.01); *H04W 36/08* (2013.01); *H04W 48/20* (2013.01); *H04W 64/006* (2013.01)

(58) Field of Classification Search
None
See application file for complete search history.

(56) References Cited

U.S. PATENT DOCUMENTS

| 6,061,337 | A | 5/2000 | Light et al. | |
|---|---|---|---|---|
| 6,195,342 | B1 * | 2/2001 | Rohani | .......................... 370/331 |
| 7,092,722 | B1 | 8/2006 | Oh et al. | |
| 2007/0123262 | A1 * | 5/2007 | Proctor, Jr. | .................... 455/442 |

FOREIGN PATENT DOCUMENTS

| EP | 1 056 304 A2 | 11/2000 |
|---|---|---|
| JP | 10 503911 | 11/1996 |

(Continued)

OTHER PUBLICATIONS

International Search Report for PCT/EP2010/052425 dated May 28, 2010.

*Primary Examiner* — Erika A Washington
(74) *Attorney, Agent, or Firm* — Fay Sharpe LLP

(57) ABSTRACT

The invention concerns a method for enhancing the handover of a mobile station (20-23) from a serving base station (1) of a cellular network to a new base station, the new base station is selected among a neighbor list including neighboring base stations, the radio coverage cell (r2-r8) of which overlaps the radio coverage cell (r1) of said serving base station (1). It is also provided the base station for carrying out the method. According to the invention it is determined a current sector (s1-s3; s1-s6) in which said mobile station (20-23) is located among a plurality of sectors (s1-s3; s1-s6) partitioning the radio coverage cell (r1) of said serving base station (1), and the neighbor list includes only the neighboring base stations the radio coverage cell (r2-r8) of which overlaps said current sector (s1-s3; s1-s6).

17 Claims, 3 Drawing Sheets

(56) References Cited

FOREIGN PATENT DOCUMENTS

| WO | WO 96/07108 A1 | 3/1996 |
| WO | WO 96/38015 | 11/1996 |
| WO | WO 99/27657 A1 | 6/1999 |
| WO | WO 01/69949 A1 | 9/2001 |

* cited by examiner

| Sector | List |
|---|---|
| s1 | l1 = {r7 ; r8 ; r2} |
| s2 | l2 = {r2 ; r3 ; r6 ; r7} |
| s3 | l3 = {r3 ; r4 ; r5 ; r6} |

| Sector | List |
|---|---|
| s1 | l1 = {r7 ; r8 ; r2} |
| s2 | l2 = {r2 ; r3} |
| s3 | l3 = {r3 ; r4} |
| s4 | l4 = {r4 ; r5 ; r6} |
| s5 | l5 = {r6 ; r7} |
| s6 | l6 = {r1} |

METHOD FOR ENHANCING THE HANDOVER OF A MOBILE STATION AND BASE STATION FOR CARRYING OUT THE METHOD

This application is the National Stage of International Application No. PCT/EP2010/052425, filed Feb. 25, 2010, which claims priority to European Patent Convention (EPC) Application No. 09305189.4, filed Mar. 2, 2009.

The invention relates generally to wireless communications, in particular, to a method for enhancing the handover of a mobile station from a serving base station of a cellular network to a new base station. The invention also relates to a particular base station for the implementation of the method.

A communication performed from a mobile station implies that the mobile station is located in the radio coverage cell of a base station. The base station performing radio exchanges with the mobile station so that it can perform the communication is commonly called the serving base station.

However, during a communication, cellular network may have to perform transfers of the communication from a serving base station to a new base station, in order to avoid loosing a call when, for instance, the mobile station gets outside the area covered by the serving base station.

This automatic transfer of the communication from the serving base station to a new base station is called handover.

With system based on large cells, the probability that a handover event occurs during a communication is small. However, the achievement of high capacities for transmitting both voice and data communications with very high throughput has required a continuous reduction of cells size. Therefore, it is very common that one or even a plurality of handovers occurs during a communication performed by a user through his mobile station.

A handover is necessary when a mobile station carrying out a communication is getting out of the serving base station or if no capacity is remaining in the cell associated with the serving base station for connecting a new communication.

More precisely, a mobile station carrying out a communication periodically performs quality and power measurements to determine if the channel conditions associated with the serving base station are satisfactory. The measurement results are transmitted in parallel of the communication to the base station. If the results indicate that the quality of the transmission is to much altered or that a too high power is needed to transmit signals to the serving base station, the serving base station gets the mobile station to perform a handover to another base stations.

Alternatively, the serving base station can detect that no capacity is remaining in its associated cell for connecting a new communication and thus prompts some mobile stations which are currently using it to perform a communication, to carry out a handover to a new base station.

A handover typically includes two phases. The first phase, commonly called observation phase, is used to select a base station neighboring the current serving base station which is the most appropriate to continue the communication with the mobile station. The second phase consists in automatically transferring the communication to the selected base station.

The fact that the communication performed from the mobile station must not be altered during the handover leads the two above quoted phases to be carried out in a very short delay.

During the observation phase, the mobile station measures, for each base station of a specific list, the signal strength which it receives from the base station. This specific list, currently named neighbor list, is transmitted to the mobile station by the serving base station when this one prompts the mobile station to perform an observation phase. The list comprises all the neighboring base stations such that the coverage area of which overlap the coverage area of the serving station.

Each signal strength measured by the mobile station is sent to the serving base station which then selects, according to the result of the measurements performed and sent by the mobile station in combination with other knowledge of the cellular network, the new base station among the base stations most adapted to continue the communication. The communication is then automatically transferred to the selected base station.

The selection of the new station is facilitated when strength signal measurements are performed with accuracy.

Actually, the neighbor list comprises all the neighboring base stations the coverage of which overlap the coverage area of the serving base station. Consequently, the number of station comprised in the list may be high and it leads the mobile station to perform a large number of strength signal measurements. This is specifically the case in urban area in which the cells have small sizes.

A minimum of delay is necessary to perform each strength signal measurement with a satisfactory accuracy. Consequently, when a serving base station has a great number of neighboring bases stations, the observation phase may take a long time to be correctly performed.

However, as mentioned above, the observation phase has to be carried out in the shortest delay as possible.

This situation leads either to extend the delay of the observation phase in order to enable the mobile station to perform all the measurements with a sufficient degree of accuracy or to perform the selection of the new base station from measurements of lesser accuracy. Both alternatives are not satisfactory to ensure handover of the communication without risking to alter or to lose the communication.

Document WO 99/27657 discloses a method for enhancing the handover of a mobile station according to the preamble of claim 1.

Other method are known, such as the method disclosed in Document U.S. Pat. No. 7,092,722 for cellular network in which each cell is divided in a plurality of sectors, for instance three sectors arranged as pie pieces, thanks to the use of a plurality of directional antennas or antenna components for the respective base station.

The aim of the present invention is to enable the handover of a mobile station in a short delay while enabling the mobile station to perform accurate strength signal measurements.

In a first aspect it is provided a method for enhancing the handover of a mobile station from a serving base station of a cellular network to a new base station, as claimed in claim 1.

When the radio coverage cell of the serving base station corresponds to the radio coverage beam of at least one directional transmitting/receiving antenna, the radio coverage beam extending along a main axis, then the radio coverage beam is partitioned in a succession of ring portions extending concentrically with respect to said antenna along the main axis and each sector of the plurality of sectors partitioning the radio coverage beam corresponds to one of said ring portion.

In this case, the current sector is determined based on an estimation of the distance between the mobile station and the antenna.

Alternatively, when the radio coverage cell of the serving base station corresponds to the radio coverage beam of at least one directional transmitting/receiving antenna, the radio coverage beam extending along a main axis, then the radio coverage beam is partitioned in a succession of ring portions extending concentrically with respect to the antenna along the main axis and each sector of the plurality of sectors partitioning said radio coverage beam corresponds to half part of one of said ring portion with respect to said main axis.

In this case, the current sector is determined based on estimation of the angle and of the distance between said mobile station and said antenna.

In a second aspect it is provided a base station for carrying out the method disclosed in the first aspect. The base station is characterized in that it comprises:

tracing means adapted to determine a current sector in which is located said mobile station; and partitioning means adapted to include in said list only the neighboring base stations the radio coverage cell of which overlaps said current sector.

The features and advantages of the invention will become more apparent from the following detailed description with reference to the attached figures wherein.

Figures 1A, 2A:
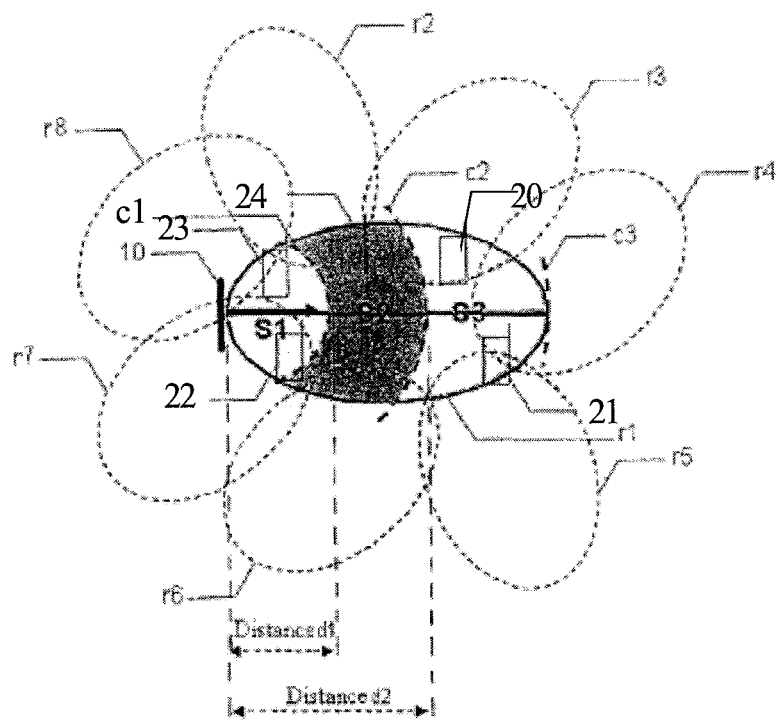
FIGS. 1a and 1b represent, schematically, two examples of a radio coverage cell of a base station divided into a plurality of sectors according to the method of the invention.
FIGS. 2a and 2b represent tables showing, for each sector disclosed respectively in FIGS. 1a and 1b, the associated list of neighboring base stations computed according to the method of the invention.

As shown in FIG. 1a a plurality of mobile stations 20, 21, 22, 23, 24 are located within the radio coverage cell r1 of a base station 1. It is assumed that mobile stations 20, 21, 22 and 23 are presently in communication and that the communications are achieved by performing at least wireless transmissions/receptions with base station 1. Thus, base station 1 is considered as the serving base station for mobile stations 20, 21, 22 and 23.

It is further assumed that mobile station 20 is moving and presently getting out of radio coverage r1 during its communication. It is thus necessary to enable a handover of this mobile station from serving base 1 to one of the neighboring stations station without altering its communication.

For enabling the handover of mobile station 20 from serving base station 1 with an appropriate new base station, serving base station 1 transmits to mobile station 20 a list including neighboring base stations, each neighboring base station included in the list having its radio coverage r2, r3, . . . , r8 overlapping radio coverage r1 of serving base station 1. Then, a new base station is selected among the neighboring base stations included in the list according to measures performed mobile station 20.

As already explained above, commonly applied method for enabling the handover of a mobile station uses a unique list comprising all the neighboring base stations of serving base station 1. More precisely, all mobile stations getting out of radio coverage cell r1 receive same unique list and perform signal strength measures with all neighboring base stations.

The method according to the invention differs from the commonly applied method in that serving base station 1 transmits a list selected among a plurality of lists according to the location of the mobile station.

More precisely, as shown on FIG. 1a, radio coverage cell r1 is divided into a plurality of sectors s1, s2 . . . , s3. For each sector s1, s2, s3, it is computed a list which only includes the neighboring base stations which have their radio coverage cell overlapping the radio coverage cell r1 of serving base station 1 within the sector.

Before transmitting the list to the mobile station, the sector in which is located the mobile station is determined. Serving base station then transmits the list computed for the sector in which the mobile station is located. Since each computed list includes only a limited number of neighboring base stations, mobile base station is able to perform strength signals measures with all the neighboring base station included in the computed list in a short time and with a satisfactory accuracy.

Referring to FIGS. 1a, 1b, 2a, 2b and 3, the various features involved in the division of the radio coverage cell into a plurality of sectors, the computation of a plurality of lists and the transmission of one list among the plurality of lists to the mobile station will be detailed in the case the serving base station comprises at least one directional antenna.

The present invention is in no way limited to the particular example embodiments explicitly shown in FIGS. 1 and 2 and described herein.

As shown on FIG. 1a, when serving base station 1 comprises at least one directional antenna (not shown) for transmitting/receiving wireless communications, the radio coverage cell r1 corresponds to the transmission/reception diagram of the directional antenna. The diagram of such a directional antenna is approximately an ellipse which corresponds to the main lobe of the directional antenna. The main axis of the ellipse corresponds to the direction of the main lobe.

As shown on FIG. 1a, in this particular configuration, base station 1 is not located in the middle of the radio coverage cell r1 but at one extremity of the ellipse, which corresponds to the location of the directional antenna.

In this case, dividing radio coverage cell r1 into sectors comprises defining a succession of circles c0, c1, . . . , cN the center of which is serving base station 1. Each circle of the successions of circles c1, c2, . . . , cN has a radius comprised between zero and the value corresponding to the broadcast range of the directional antenna in the direction of the main axis.

For the purpose of a better understanding of the invention, it is considered that the first circle C0 of the successions of circles has a radius equal to zero and consists in the point at which the base station is located. The last circle cN of the successions of circles has a radius equal to the broadcast range.

Each sector corresponds to the area defined as the intersection of the ellipse and the ring limited by two successive circles.

In the particular example shown on FIG. 1a, a succession of four circles c0, c1, . . . , c3 has been defined and radio coverage area cell r1 of serving base station 1 has been divided into three sectors s1, s2, s3.

According to the method of the invention, after the sectors have been defined, for each sector, a particular list is computed. Each particular list, computed and associated to a sector, only includes the neighboring base stations which have their radio coverage cell overlapping the radio coverage cell r1 of serving base station 1 within this sector.

FIG. 2a represents a table comprising computed lists l1, l2, l3 respectively associated with sectors s1, s2 and s3 as illustrated on FIG. 1a. As shown in the table, sector s1 is associated with list l1 including the neighboring base stations respectively associated with radio coverage cells r7, r8 and r2 since only these radio coverage cells overlap radio coverage cell r1 in sector s1. Similarly, list l2 associated with sector s2, includes the four neighboring base stations respectively associated with radio coverage cells r6, r7, r2 and r3 and list l3 computed for sector s3 only comprises the four neighboring base stations the radio coverage cells of which are respectively r3, r4, r5 and r6.

Advantageously, serving base station 1 may comprise a dedicated neighbor list computation module 10 which is in charge of computing the different lists once the sectors have been defined. Such a module 10 may have knowledge of the topology of the wireless network. More precisely, neighbor list computation module may be implemented with geographical information such that location of the neighboring base station and broadcast range of the antenna implemented in the neighboring base station. According to the geographical information, neighbor list computation module 10 determines the neighboring base stations the respective radio coverage cell of which overlaps radio coverage cell r1 within a particular sector.

In addition, the number and size of sectors may be set by the management system (not shown) of serving base station 1. The number of sectors may be different in each base station of the wireless network. A great number of sectors leads to a small number of base stations per list. Consequently, it is better to define a great number of sectors such that the mobile station will have to perform few signal strength measures during a handover.

As shown in the table represented on FIG. 2a, two different lists may comprise a different number of neighboring base station and redundancy is permitted since a neighboring base station may be included in two different lists.

Advantageously, the number and the size of the sectors are set such that the means size of all the lists is minimized. Depending of the topology of the wireless network (i.e. number and location of the neighboring base stations), it may be advantageous that the rings used to define the sectors have different width. (The width of the ring is the difference between the radius of two successive circles).

In addition, it may be advantageous that the difference between the number of neighboring base stations of the list including the largest number of neighboring base stations and the number of neighboring base stations of the list including the smallest number of neighboring base stations is minimized.

The adjustment of the size or of the number of sectors enables to avoid some sectors having a list including a very small number of neighboring base stations whereas some other sectors having large lists. Consequently, mobile station will be provided with lists including approximately the same number of neighboring base stations no matter the sector within which it is located when performing a handover.

Alternatively, the number or the size of the sectors is set to minimize the redundancy between the different lists.

According to the method of the invention, for enabling the handover of a mobile station from the serving station to one of the neighboring base stations, the sector within which the mobile station is located is determined and the list associated to this sector is transmitted to the mobile station.

In the case the serving base station comprises at least a directional antenna, as it has already been considered in the example illustrated by FIG. 1a, the determination of the sector is performed by determining the distance between the mobile station and the serving base station.

The determination of such a distance may be performed by a measurement module 11 of serving base station 1, by interpreting, for instance, the results of power signal measures periodically performed and transmitted by a mobile station when performing a communication via a base station.

After measurement module 11 has determined the distance between the mobile station and the serving base station, the determined distance may be transmitted to a neighbor list computation module 12 which uses this information to identify the sector within which the mobile station is located.

In one embodiment, the determined distance is compared with the different radius of the circles used to define the sectors. More precisely, when the determined distance is comprised between the radius circle $c_i$ and the radius of circle $c_{i+1}$, the mobile station is considered to be located in the sector $s_i$ corresponding to the intersection of the ellipse and the ring limited by circles $c_i$ and $c_{i+1}$.

Alternatively, neighbor list selection module 10 first computes, for each sector, the means value of the two radius of the successive circles used to defined the sector. Module 10 then computes the difference between the determined distance and each means value. The mobile station is considered to be located in the sector the means value of which minimizes the difference with the determined distance.

Referring to FIG. 1a and assuming that mobile stations 20, 21, 22 and 23 are getting out of radio coverage cell r1. Since distances d20 and d21 between mobile stations 20 and 21 and serving base station 1 are comprised between radius of circles c2 and c3, serving base station determines that they are both located in sector s3 and transmit list l3 to them. Mobile base station will then perform strength signal measurement only with base station associated with radio coverage cells r3, r4, r5 and r6.

Conversely, mobile station 22 and 23 are provided with list l1 which only includes three base stations. Since only a limited number of neighboring base stations is provided to mobile stations 20, 21, 22 and 23, strength measures with these neighboring base stations can be performed in a short and with a satisfactory accuracy.

As well illustrated on FIG. 1a, it is to be noticed that when such sectors are defined, the mobile station will be provided with a list which only includes the base stations under the radio coverage cell of which the mobile station is more likely to be located when definitively getting out of the radio coverage cells of the serving base station.

As described above with reference to FIGS. 1a and 2a, all the mobile stations located at the same distance from the serving base station will be provided with the same list of neighboring base stations.

However, as shown on FIG. 1a although mobile stations 20 and 21 are provided with the same list l3, considering their respective current location in sector s3, it will be reasonably believed that the selected base station from the list to continue the communication will be different. Indeed, considering the location of mobile station 20, one can considers that the most adapted new base station is the base station associated with radio coverage r5. On the contrary, the future base station used to enable the continuation of the communication performed by mobile station 21 is certainly the base station associated with radio coverage r3.

Although the distances between serving base station and mobile stations 20 and 21 are approximately the same, they are located at two opposite border of radio coverage cell r1. The use of the direction of signal transmitted by mobile stations 20 and 21 and received by the antenna of serving base station 1 would be useful to reduce the number of neighboring base station included in the list without risking to remove from the list the most likely neighboring base station to be selected.

Figures 1B, 2B:
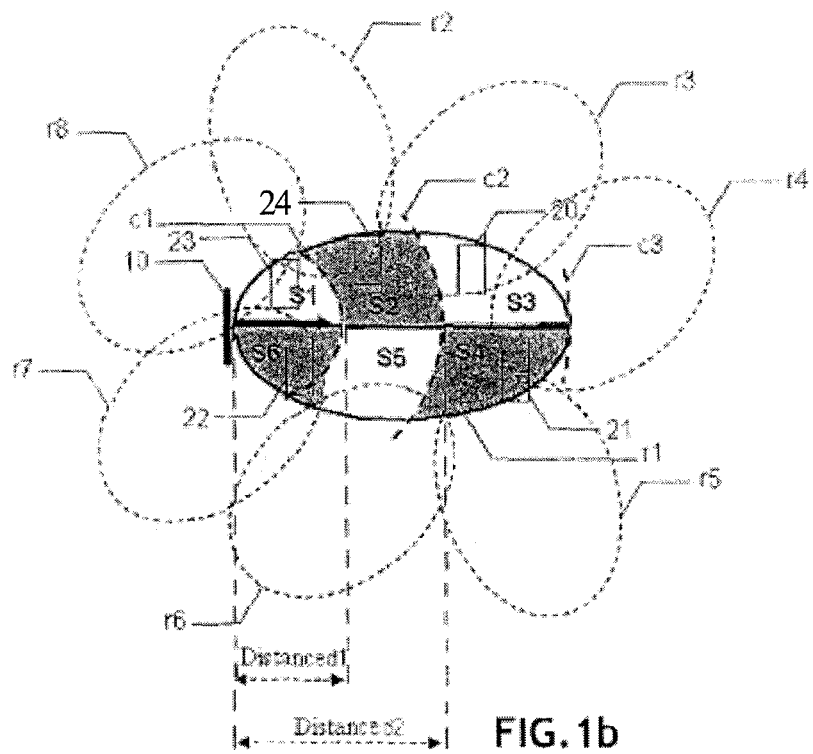
Figure 3:
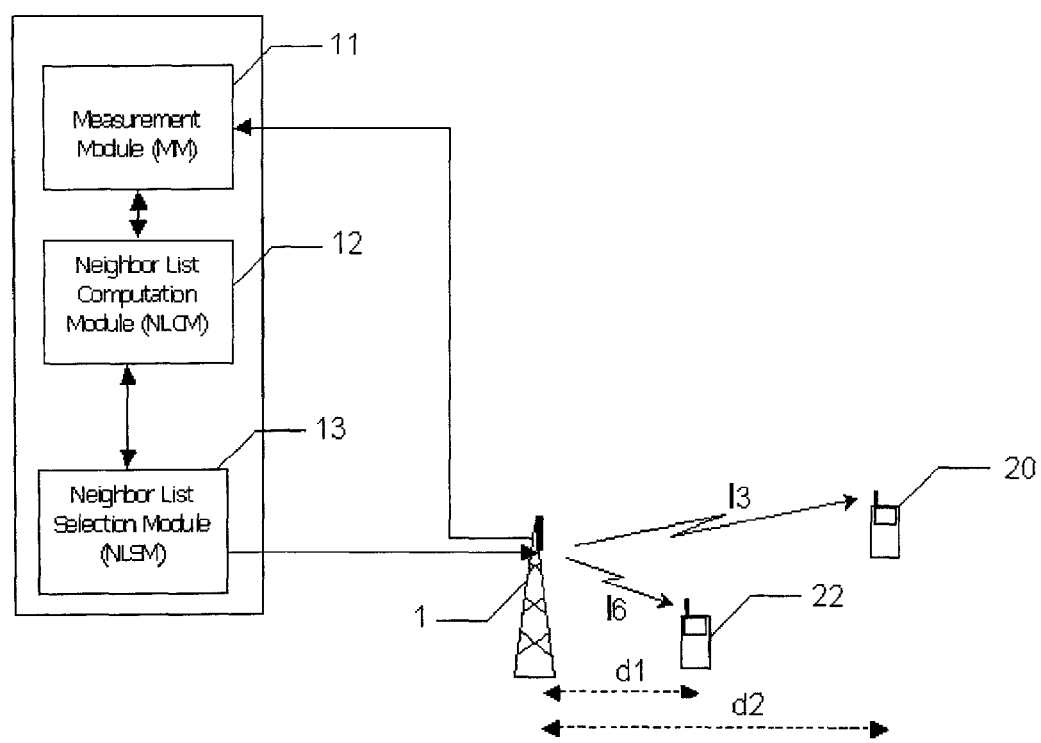
FIG. 3 represents, schematically, processing components located in a base station and their interactions for enabling a handover of a mobile station from the base station according to the method of the invention.

FIG. 1b represents the same radio coverage cell than FIG. 1a in which each sectors disclosed in FIG. 1a has been divided into two sectors according to the mains axis of the transmission/reception diagram of the directional antenna.

More precisely, as shown on FIG. 1b, a sector corresponds to the part of the intersection, as defined when referring to FIG. 1a, which is located on the left side, respectively on the right side, of the main axis of the transmission/reception diagram of the directional antenna.

Thus, with the same succession of circles c0, c1, ..., c3, radio coverage cell r1 of serving base station is divided into six sectors s1, s2, ... s6.

In the case each sector is only located on the left side or on the right side of the main axis, as illustrated by FIG. 1b, the determination of the sector in which is located the mobile station further comprises the direction of the signal transmitted from the mobile station and received at the serving base station.

Consequently, mobile stations 20 and 21, which were provided with the same initial list when only the distances between mobile stations and serving base station were taking into account, are, in the present case, providing with two different lists. These two different lists correspond to the initial list from which neighboring base station located on the other side of the main axis with respect to the side in which is located mobile station 20, respectively mobile station 21, have been removed.

FIG. 2b represents a table comprising computed lists l1, l2, ..., l6 respectively associated with sectors s1 to s6 as illustrated on FIG. 1b. As shown in the table, sector s3 is associated with the list l3 including the neighboring base stations respectively associated with radio coverage cells r3 and r4. Similarly, list l4, associated with sector s4, includes the three neighboring base stations respectively associated with radio coverage cells r4, r5 and r6.

When radio coverage base station r1 is divided in the manner illustrated on FIG. 1b, determining the sector in which the mobile station is located consists on performing an estimation of the distance between the serving base station and the mobile base station and performing an estimation of the direction of the signal transmitted from the mobile and received by the antenna.

The direction of the received signal may be performed by determining the angle existing between the direction of the received signal and the direction of the main axis of the transmission/reception diagram of the antenna.

In case the antenna consists in a plurality of transmission/reception radiating elements enable to be used according to a beamforming technique, the angle may be computed by an estimation of the time difference between the reception times of the signal emitted by the mobile station on two different radiating elements of the antenna.

Although the different technical features and advantages of the invention have been described with referring to the transmission/reception diagram of one specific directional antenna implemented in a base station, the invention is not limited to base station using only one directional antenna. Indeed, currently used base stations are bisectorial or trisectorial. These base stations are implemented with two or three directional antennas and the radio coverage cell of the base station correspond to sum of the transmission/reception diagrams of each directional antenna. Dividing the radio coverage cell of the base station consists then in dividing each transmission/reception diagram respectively associated with one of the directional antenna implemented in the base station according to what have been disclosed when referring to FIGS. 1a and 1b.

A commonly located process can be used to determine both the position angle and the distance of the terminal from the antenna of the base station.

In other embodiment, the radio coverage cell of the serving base station may correspond to the transmission/reception diagram of an omni-directional antenna. In this case, each of said plurality of sectors corresponds to an angular sector of said transmission/reception diagram, and said current sector is determined based on an estimation of the angle between said mobile station and said omni-directional antenna.

The invention claimed is:

1. A method for enhancing the handover of a mobile station from a serving base station of a cellular network to a new base station, the new base station being selected among a neighbor list including neighboring base stations, the radio coverage cell of which overlaps the radio coverage cell of the serving base station, the method comprising:
   determining at the serving base station the location of the mobile station within the radio coverage cell of the serving base station; and
   transmitting to the mobile station a reduced neighbor list based on the location;
   wherein determining the location of the mobile station comprises:
      before the handover, partitioning the radio coverage cell of the serving base station into a plurality of sectors;
      before the handover, determining, for each sector of the plurality of sectors, a sector list including only the neighboring base stations the radio coverage cells of which overlaps the sector;
      determining a current sector in which the mobile station is located among the plurality of sectors; and
      selecting the sector list of the current sector as the reduced neighbor list, wherein the reduced neighbor list includes only the neighboring base stations the radio coverage cells of which overlaps the current sector, and
   wherein the radio coverage cell of the serving base station corresponds to the radio coverage beam of at least one directional transmitting/receiving antenna, the radio coverage beam extending along a main axis, wherein the radio coverage beam is partitioned in a succession of ring portions extending concentrically with respect to the directional transmitting/receiving antenna along the main axis, wherein each of the plurality of sectors partitioning the radio coverage beam corresponds to half part of one of the ring portion with respect to the main axis, and wherein the current sector is determined based on an estimation of the angle and of the distance between the mobile station and the directional transmitting/receiving antenna.

2. The method as claimed in claim 1, wherein the directional transmitting/receiving antenna includes an array of radiating elements adapted to perform a transmission/reception according a beamforming technique, and wherein the estimation of the angle is based on the time difference between the reception times of the signal emitted by the mobile station on two different radiating elements of the directional transmitting/receiving antenna.

3. The method as claimed in claim 1, further comprising:
   determining the number of neighboring base stations included into each sector list; and
   modifying the size or the number of the sectors partitioning the radio coverage cell of the serving base station in order to balance the number of neighboring base stations of each sector list.

4. A method for enhancing the handover of a mobile station from a serving base station of a cellular network to a new base station, the new base station being selected among a neighbor list including neighboring base stations, the radio coverage cell of which overlaps the radio coverage cell of the serving base station, the method comprising:

determining at the serving base station the location of the mobile station within the radio coverage cell of the serving base station; and transmitting to the mobile station a reduced neighbor list based on the location;

wherein determining the location of the mobile station comprises:

partitioning the radio coverage cell of the serving base station into a plurality of sectors; and determining a current sector in which the mobile station is located among the plurality of sectors, wherein the reduced neighbor list includes only the neighboring base stations the radio coverage cell of which overlaps the current sector;

wherein the radio coverage cell of the serving base station corresponds to the radio coverage beam of at least one directional transmitting/receiving antenna, the radio coverage beam extending along a main axis, wherein the radio coverage beam is partitioned in a succession of ring portions extending concentrically with respect to the directional transmitting/receiving antenna along the main axis, wherein each of the plurality of sectors partitioning the radio coverage beam corresponds to one of the ring portion, and wherein the current sector is determined based on an estimation of the distance between the mobile station and the directional transmitting/receiving antenna.

5. The method as claimed in claim 4, wherein the estimation of the distance is based on results of signal strength measurements sent by the mobile station to the serving base station.

6. The method as claimed in claim 4, wherein the radio coverage cell of the serving base station corresponds to a plurality of radio coverage beams of a plurality of directional transmitting/receiving antennas, and wherein the method is performed with the antenna of the plurality of directional transmitting/receiving antennas via which the mobile station is carrying out the communication.

7. A method for enhancing the handover of a mobile station from a serving base station of a cellular network to a new base station, the new base station being selected among a neighbor list including neighboring base stations, the radio coverage cell of which overlaps the radio coverage cell of the serving base station, the method comprising the steps of:

determining at the serving base station, the location of the mobile station within the radio coverage cell of the serving base station; and transmitting to the mobile station a reduced neighbor list based on the location;

wherein determining the location of the mobile station comprises:

partitioning the radio coverage cell of the serving base station in a plurality of sectors; and determining a current sector in which the mobile station is located among the plurality of sectors, in that the reduced neighbor list includes only the neighboring base stations the radio coverage cell of which overlaps the current sector;

wherein the radio coverage cell of the serving base station corresponds to the transmission/reception diagram of an omni-directional antenna, wherein each of the plurality of sectors corresponds to an angular sector of the transmission/reception diagram, and wherein the current sector is determined based on an estimation of the angle between the mobile station and the omni-directional antenna.

8. A serving base station of a cellular network configured to handover of mobile station to a new base station, the new base station being selected among a neighbor list including neighboring base stations, the radio coverage cell of which overlaps the radio coverage cell of the serving base station, the serving base station, in handing over the mobile station to the new base station, being configured to:

determine the sector in which the mobile station is located within the radio coverage cell of the serving base station, wherein determining the location of the mobile station comprises:

before the handover, partitioning the radio coverage cell of the serving base station into a plurality of sectors;

before the handover, determining, for each sector of the plurality of sectors, a sector list including only the neighboring base stations the radio coverage cells of which overlap the sector;

determining a current sector in which the mobile station is located among the plurality of sectors; and selecting the sector list of the current sector as the reduced neighbor list, wherein the reduced neighbor list includes only the neighboring base stations the radio coverage cells of which overlap the current sector;

transmit to the mobile station a reduced neighbor list based on the location, wherein the reduced neighbor list includes only the neighboring base stations the radio coverage cells of which overlap the sector in which the mobile station is located, wherein the radio coverage cell of the serving base station corresponds to the radio coverage beam of at least one directional transmitting/receiving antenna, the radio coverage beam extending along a main axis, wherein the radio coverage beam is partitioned in a succession of ring portions extending concentrically with respect to the directional transmitting/receiving antenna along the main axis, wherein each of the plurality of sectors partitioning the radio coverage beam corresponds to half part of one of the ring portion with respect to the main axis, and wherein the current sector is determined based on an estimation of the angle and of the distance between the mobile station and the directional transmitting/receiving antenna.

9. The serving base station as claimed in claim 8, wherein the serving base station is further configured to determine, for each sector of the plurality of sectors, a sector list including only the neighboring base stations the radio coverage cells of which overlaps the sector.

10. The serving base station as claimed in claim 9, wherein the serving base station is further configured to:

determine the number of neighboring base stations included into each sector list; and modify the size or the number of the sectors partitioning the radio coverage cell of the serving base station in order to balance the number of neighboring base stations of each sector list.

11. A serving base station of a cellular network for enhancing the handover of a mobile station from the serving base station to a new base station of the cellular network, the new base station being selected among a neighbor list including neighboring base stations, the radio coverage cells of which overlaps the radio coverage cell of the serving base station, wherein the serving base station includes:

at least one module configured to:

determine the location of the mobile station within the radio coverage cell of the serving base station, wherein the determination includes:

before the handover, partitioning the radio coverage cell of the serving base station into a plurality of sectors;

before the handover, determining, for each sector of the plurality of sectors, a sector list including only the neighboring base stations the radio coverage cell of which overlaps the sector;

determining a current sector in which the mobile station is located among the plurality of sectors; and selecting the sector list of the current sector as a reduced neighbor list, wherein the reduced neighbor list includes only the neighboring base stations the radio coverage cell of which overlaps the current sector; and transmit to the mobile station a reduced neighbor list based on the location, wherein the reduced neighbor list includes only the neighboring base stations the radio coverage cell of which overlaps the current sector, wherein the radio coverage cell of the serving base station corresponds to the radio coverage beam of at least one directional transmitting/receiving antenna, the radio coverage beam extending along a main axis, wherein the radio coverage beam is partitioned in a succession of ring portions extending concentrically with respect to the directional transmitting/receiving antenna along the main axis, wherein each of the plurality of sectors partitioning the radio coverage beam corresponds to one of the ring portion, and wherein the current sector is determined based on an estimation of the distance between the mobile station and the directional transmitting/receiving antenna.

12. The serving base station as claimed in claim 11, wherein the estimation of the distance is based on results of signal strength measurements sent by the mobile station to the serving base station.

13. The serving base station as claimed in claim 11, wherein the radio coverage cell of the serving base station corresponds to a plurality of radio coverage beams of a plurality of directional transmitting/receiving antennas, and wherein the method is performed with the antenna of the plurality of directional transmitting/receiving antennas via which the mobile station is carrying out the communication.

14. The serving base station as claimed in claim 11, wherein the radio coverage cell of the serving base station corresponds to the transmission/reception diagram of an omni-directional antenna, wherein each of the plurality of sectors corresponds to an angular sector of the transmission/reception diagram, and wherein the current sector is determined based on an estimation of the angle between the mobile station and the omni-directional antenna.

15. The serving base station as claimed in claim 11, wherein the at least one module is further configured to:
determine the number of neighboring base stations included into each sector list; and
modify the size or the number of the sectors partitioning the radio coverage cell of the serving base station in order to balance the number of neighboring base stations of each sector list.

16. The serving base station as claimed in claim 11, wherein the radio coverage cell of the serving base station corresponds to the radio coverage beam of at least one directional transmitting/receiving antenna, the radio coverage beam extending along a main axis, wherein the radio coverage beam is partitioned in a succession of ring portions extending concentrically with respect to the directional transmitting/receiving antenna along the main axis, wherein each of the plurality of sectors partitioning the radio coverage beam corresponds to half part of one of the ring portion with respect to the main axis, and wherein the current sector is determined based on an estimation of the angle and of the distance between the mobile station and the directional transmitting/receiving antenna.

17. The serving base station as claimed in claim 16, wherein the directional transmitting/receiving antenna includes an array of radiating elements adapted-configured to perform a transmission/reception according a beamforming technique, and wherein the estimation of the angle is based on the time difference between the reception times of the signal emitted by the mobile station on two different radiating elements of the directional transmitting/receiving antenna.

* * * * *